Nov. 6, 1951  I. G. GUGLIELMONI  2,573,965
COMBINATION KITCHEN SINK AND DISHWASHING CABINET
Filed Feb. 28, 1945  2 SHEETS—SHEET 1
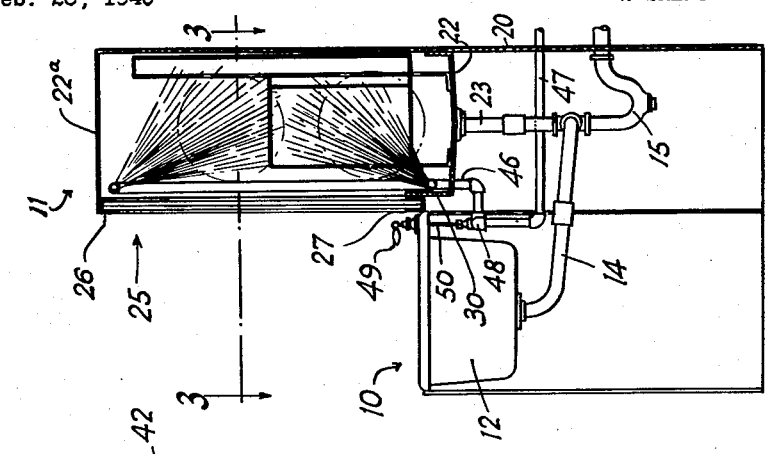
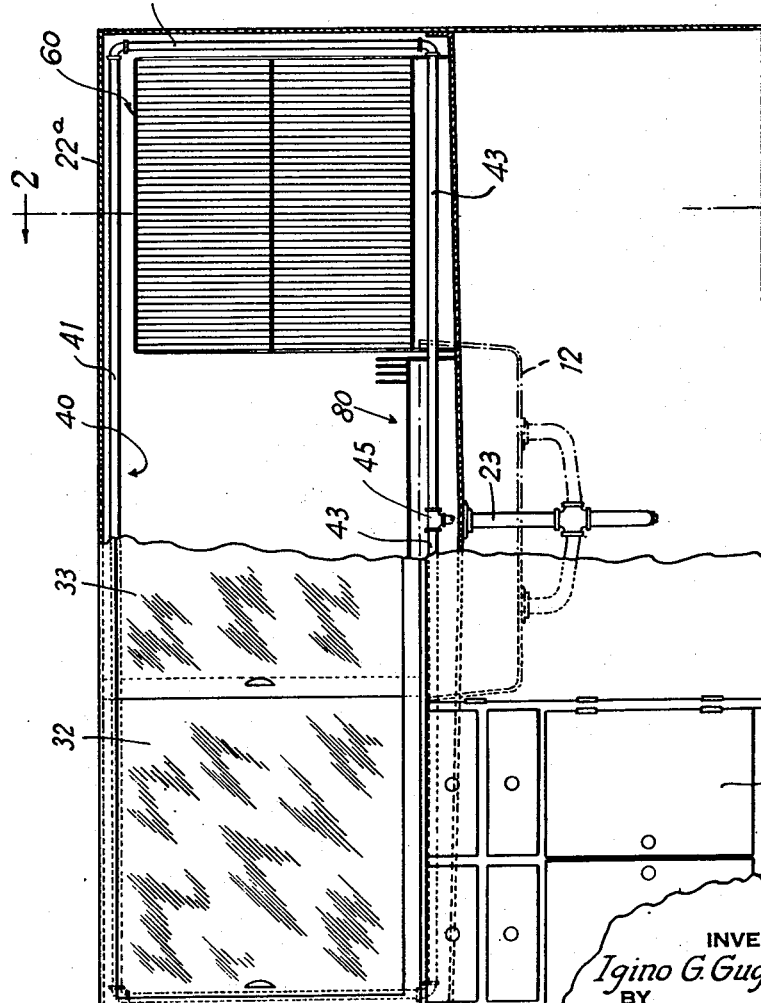
INVENTOR
Igino G. Guglielmoni
BY
J. B. Felshin
ATTORNEY Nov. 6, 1951     I. G. GUGLIELMONI     2,573,965
COMBINATION KITCHEN SINK AND DISHWASHING CABINET
Filed Feb. 28, 1945     2 SHEETS—SHEET 2
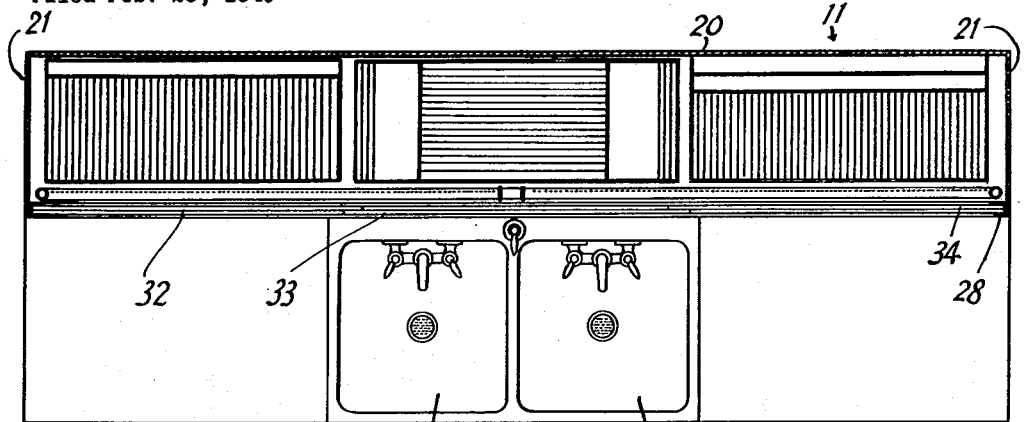
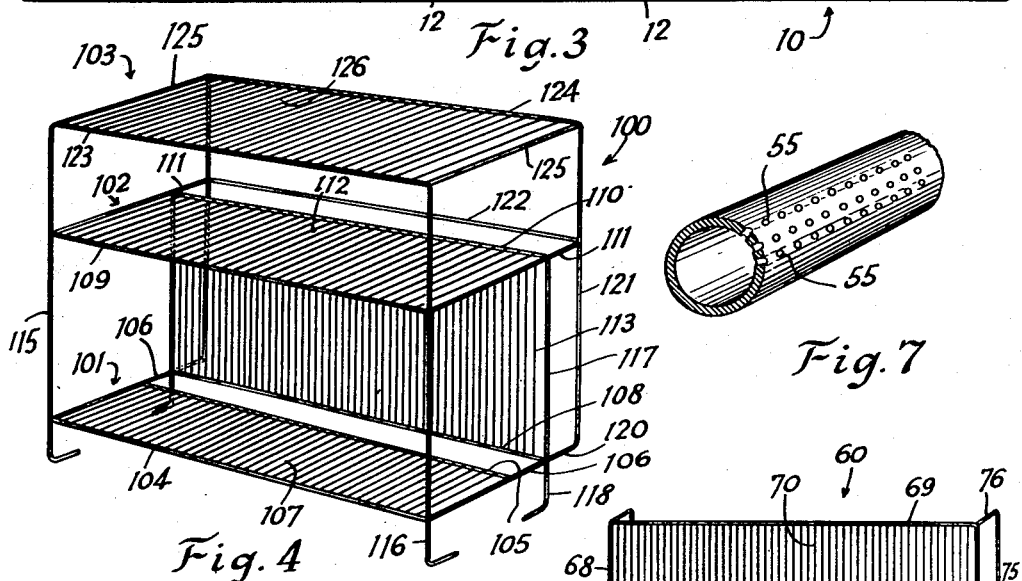
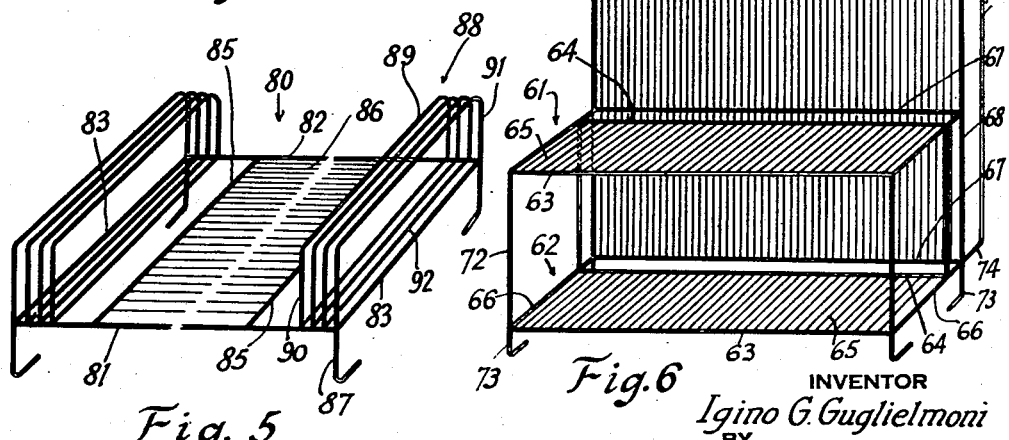
INVENTOR
Igino G. Guglielmoni
BY
J.B. Feldin
ATTORNEY Patented Nov. 6, 1951

2,573,965

UNITED STATES PATENT OFFICE 2,573,965

COMBINATION KITCHEN SINK AND DISHWASHING CABINET

Igino G. Guglielmoni, Massapequa, N. Y.

Application February 28, 1945, Serial No. 580,131

6 Claims. (Cl. 134—88)

1

This invention relates to apparatus for cleaning kitchen articles. It is particularly directed to a cabinet in which may be placed dishes, cups, silverware and other kitchen articles, and which is provided with means for sprinkling, rinsing or steaming said articles.

An object of this invention is to provide a cabinet of the character described into which may be placed dishes, cups, silverware, pots, pans, platters, etc., which have been previously washed with soap, the cabinet being provided with sprinkler means for rinsing off the soap with hot water. The articles within the cabinet may remain and be stored in the cabinet after they are sprinkled, until they are again to be used.

A further object of this invention is to provide a cabinet of the character described having means for storing dishes spaced from one another and at different levels, and means for sprinkling water on the dishes from above and below so as to thoroughly rinse the dishes.

Yet a further object of this invention is to provide a cabinet of the character described provided with means for storing dishes, platters, silverware, cups, glasses, and the like articles, in a small and compact space.

Yet a further object of this invention is to provide a cabinet of the character described, which may be placed in back of a sink unit by moving the sink forward away from the wall, and placing the cabinet in back of the sink unit.

Yet a further object of this invention is to provide a cabinet of the character described, which is disposed in back of the sink unit and projects above the sink unit, and which has at the front, glass panels or other closure means which may be opened, and removable trays within the cabinet to support the articles to be washed or rinsed and a sprinkler pipe at the bottom, top and sides of the cabinet formed with perforations to sprinkle water down from the top pipe and up from the bottom pipe onto the articles on the trays.

Yet a further object of this invention is to provide a compact and durable article of the character described, which shall be relatively inexpensive to manufacture, which shall be easy to install, easy to manipulate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a front elevational view of a cabinet embodying the invention, and sink cabinet, with parts broken away to show the interior construction;

Fig. 2 is a cross-sectional view taken on line 2—2 of Fig. 1;

Fig. 3 is a cross-sectional view taken on line 3—3 of Fig. 2;

Fig. 4 is a perspective view of one of the removable trays within the cabinet;

Fig. 5 is a perspective view of another tray within the cabinet;

Fig. 6 is a perspective view of still another tray within the cabinet; and

Fig. 7 is a partial perspective view of a sprinkler pipe showing the perforations therein.

Referring now in detail to the drawing, 10 designates a sink unit and 11 designates a cabinet embodying the invention for washing, sprinkling, rising or steaming kitchen articles. The sink unit 10 may be of usual construction well known in the art. It is provided with a pair of basins 12 and with cabinets 13 on opposite sides of the basins. The basins are provided with a drain pipe 14 and with a trap 15 as is usual.

The cabinet 11 is disposed in back of the unit 10 and extends above said unit. Cabinet 11 may be of the same length as unit 10 as shown in Fig. 3 of the drawing. The cabinet 11 has a back wall 20, side walls 21, and a top wall 22a. Somewhat below the upper surface of the sink unit 10 and disposed within cabinet 11 is a bottom wall 22. The bottom wall 22 is pitched downwardly toward the middle so as to drain water off by means of drain pipe 23 which may join with the drain pipe 14.

At the front of the cabinet 11 is a frame 25, having a top portion 26, a bottom portion 27, and side portions 28. The frame 25 is of channel construction as shown in the drawing. Interconnecting the bottom wall 22 with the bottom frame portion 27 is a front wall 30. Within the frame 25 are three sliding transparent panels or doors 32, 33 and 34. The sliding panels or doors overlap and form a water tight connection so that when the doors close, the cabinet is fully water tight. Any suitable wiping elements or gaskets may be provided where the center panel 33 overlaps the side panels so as to form a water tight connection.

Within the cabinet and adjacent the front thereof is a sprinkler 40. The same comprises a top pipe portion 41, side pipe portions 42, and a bottom pipe portion 43. These pipes are all interconnected by elbows at the corners. The bottom pipe is in two sections interconnected to a T-connection 45. Connected into the T-connection is a pipe 46 passing down through a bushing in the bottom wall 22 of the cabinet. Pipe 46 may be connected to a hot water supply 47. Interposed in the pipe 46 is a valve 48 which may be controlled by a valve handle 49 disposed above the basin and in front of cabinet 11, and connected by a stem 50 to the valve. Thus handle 49 may be turned in one direction to supply hot water to the sprinkler pipes, and in an opposite direction to shut off the water supply.

The sprinkler pipes may be provided with a plurality of longitudinally spaced, and angularly spaced openings 55 so distributed as to sprinkle water at various angles.

Obviously the openings in the top pipe 41 are so located as to sprinkle water downwardly on the dishes and other articles in the cabinet, whereas the openings in the lower pipes 43 are so arranged as to sprinkle water at different angles onto the dishes or other articles within the cabinet.

At the right side of the cabinet is a tray or frame 60. Frame 60 shown in Fig. 6 of the drawing, is made of wire welded or soldered together and is removably mounted within the cabinet and rests on the bottom wall thereof. Tray or frame 60 comprises a pair of similar shelves 61 and 62 at different levels. Each shelf comprises a pair of parallel, longitudinal rods 63 and 64 interconnected by parallel wires 65 extending from front to rear. At the ends of rods 63, 64 are rods 66 extending rearwardly beyond rod 64. The rods 66 are interconnected by rods 67 parallel to and spaced from rods 64. Interconnecting the ends of rods 67 are vertical rods 68 extending above the upper shelf. The upper ends of rods 68 are interconnected by vertical wires 70 disposed in the planes of the wires 65. The front ends of the rods 66 are interconnected by vertical rods 72. The rods 72 and 68 are provided with legs 73 on which the frame rests on the bottom wall. Rods 66 extend rearwardly beyond rod 68 as at 74. Extending upwardly from portions 74 of rod 66 are vertical rods 75 interconnected at their upper ends to the upper ends of rods 68 by rod portions 76. It will now be understood that dishes may be supported on rods 63, 64 being spaced apart by wires 65 and engaging between wires 70. Dishes may thus be supported on the upper and lower shelves 61 and 62 and are maintained in vertical position by the rear wires 70. The frame portions 74, 75, 76 contact the rear wall 20 of the cabinet to properly space the frame within the cabinet. The frame 60 may occupy about one-third of the cabinet and is located on one side of the cabinet.

In the middle of the cabinet is a frame 80 removably supported on the bottom wall. Frame 80 is for the purpose of supporting larger platters as well as knives, forks, and spoons. Frame 80 comprises front and rear rods 82 interconnected by end rods 83. Interconnecting the front and rear rods 81, 82 are spaced rods 85, spaced from the end rods 83 and extending from front to rear. The rods 85 are interconnected by longitudinal parallel wires 86 preferably spaced about one inch apart.

Trays may be placed between the wires 86, the ends of the trays being engaged by the rods 85. The frame may be supported on front and rear legs 87 as shown in Fig. 5 of the drawing. On each end of the frame 80 are a plurality of parallel spaced rectangular wire frames 88, disposed in vertical planes, and each having a top portion 89, a front portion 90, a rear portion 91, and a bottom portion 92. Frames members 88 extend from front to rear. Portion 92 interconnects the rods 81, 82 as shown in the drawing. Knives, forks, and spoons may be suspended on the top portions 89. These articles may be slidably moved into the slots formed between the members 88 and suspended for the rinsing or washing operation.

At the left side of the cabinet is a frame member or tray 100, likewise removably mounted on bottom wall 22. Frame member 100 comprises three shelves: a bottom shelf 101, a middle shelf 102, and a top shelf 103. The bottom shelf 101 comprises front and rear longitudinal rods 104 and 105 interconnected by end rods 106. Rods 104, 105 are interconnected by spaced parallel wires 107 extending from front to rear. Rods 106 are interconnected by a longitudinal rod 108 parallel to rod 105 and spaced therefrom. Shelf 102 comprises a front rod 109 above rod 104 and a rod 110 above rod 108. Rods 109, 110 are interconnected by end rods 111. Rods 109 and 110 are interconnected by a plurality of horizontal wires 112 in the same planes as the wires 107. Rods 108 and 110 are interconnected by vertical spaced wires 113 in the planes of wires 107 and 112. Rods 106 and 111 are interconnected by front, vertical rods 115 which extend up to the upper shelf 103. Said rods 115 are provided with front legs 116. The ends of rods 108 and 110 are interconnected by vertical rods 117 provided with rear legs 118. Rods 106 extend rearwardly beyond the rods 117 as at 120. Extending upwardly from rod portions 120 are vertical rods 121. The rods 111 extend to and are connected to rods 121. The rear ends of rods 111 are interconnected by a horizontal rod 122 parallel to the rods 109 and 110 and interconnecting the rods 121. The rods 121 also extend upwardly to the top shelf. The top shelf comprises a front rod 123 and a rear rod 124 and end rods 125. The front and rear rods 123, 124 are interconnected by wires 126 extending from front to rear.

It will now be understood that the rear rods 121 contact the back of the cabinet. Dishes may be placed on the bottom shelf 101 and engage the wires 113. Cups, glasses, or other utensils may be placed on the shelves 102, 103. The dishes, glasses or other utensils may be first washed in soap. They may then be placed on the cabinet on the various trays or frames. The cabinet panels or doors 32, 33, 34 are then closed and the valve handle 49 opened to supply hot water to the sprinkler pipes. The dishes or other articles are thus thoroughly rinsed and the water passes off to the drain 33. All the dishes or other articles within the cabinet may then be left to dry. The cabinet thus serves as a storage closet for the dishes and other articles.

The height of the cabinet 11 may be 52" which places the top of the cabinet just below a usual high kitchen window. Articles such as flower pots may be placed on the top of the cabinet to beautify the kitchen.

If desired, steam may be supplied to the cabinet through the pipes accelerating drying dishes or other articles.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In combination, a sink cabinet, a rinsing cabinet in back of the sink cabinet and extending above the sink cabinet, said rinsing cabinet being open at the front, transparent means to close the front of the rinsing cabinet, means within the rinsing cabinet to support articles to be rinsed, and a sprinkler means within the rinsing cabinet at the top and bottom thereof and running lengthwise adjacent the front of said rinsing cabinet, and means on the sink cabinet to control supply of water to the sprinkler means.

2. In combination, a sink cabinet, and a rinsing cabinet disposed wholly in back of the sink cabinet and projecting above said sink cabinet, said rinsing cabinet having a bottom wall disposed below the upper level of the sink cabinet, said rinsing cabinet having a front wall provided with a closure means disposed wholly above the sink cabinet, sprinkler means within said rinsing cabinet, and adjacent the front thereof.

3. In combination, a sink cabinet, and a rinsing cabinet disposed wholly in back of the sink cabinet and projecting above said sink cabinet, said rinsing cabinet having a bottom wall disposed below the upper level of the sink cabinet, said rinsing cabinet having a front wall provided with a closure means disposed wholly above the sink cabinet, sprinkler means within said rinsing cabinet and adjacent the front thereof, said sprinkler means comprising pipes located within the rinsing cabinet and located at the top and bottom thereof and adjacent the front thereof, and a removable support for articles to be rinsed, located within the rinsing cabinet and between the sprinkler means and back wall of the rinsing cabinet.

4. In combination, a sink cabinet, and a rinsing cabinet disposed wholly in back of the sink cabinet and projecting above said sink cabinet, said rinsing cabinet having a bottom wall disposed below the upper level of the sink cabinet, said rinsing cabinet having a front wall provided with a closure means disposed wholly above the sink cabinet, sprinkler means within said rinsing cabinet, and adjacent the front thereof, said sprinkling means comprising pipes located within the rinsing cabinet and located at the top and bottom thereof and adjacent the front thereof, and a removable support for articles to be rinsed, located within the rinsing cabinet and between the sprinkler means and back wall of the rinsing cabinet, said closure means comprising transparent panels adapted to be selectively opened to give access to different parts of the cabinet, and means at the top of the sink cabinet to control the sprinkler means within the rinsing cabinet.

5. In combination, a sink cabinet, a rinsing cabinet in back of the sink cabinet and extending above the sink cabinet, said rinsing cabinet being open at the front, means to close the front of the rinsing cabinet, means within the rinsing cabinet to support articles to be rinsed, sprinkler means within the rinsing cabinet, and means on the sink cabinet and in front of the rinsing cabinet to control the supply of water to the sprinkler means.

6. In combination, a sink cabinet, a rinsing cabinet in back of the sink cabinet and extending above the sink cabinet, said rinsing cabinet being open at the front, means to close the front of the rinsing cabinet, means within the rinsing cabinet to support articles to be rinsed, sprinkler means within the rinsing cabinet, and means on the sink cabinet and in front of the rinsing cabinet to control the supply of water to the sprinkler means, drain pipes extending from the sink cabinet and rinsing cabinet and means joining said drain pipes in a common outlet.

IGINO G. GUGLIELMONI.

REFERENCES CITED

The following references are of record in the file of this patent:

UNITED STATES PATENTS

| Number | Name | Date |
|---|---|---|
| 587,113 | Belknap | July 27, 1897 |
| 1,037,073 | Sonnemann | Aug. 27, 1912 |
| 1,074,932 | Dickenson | Oct. 7, 1913 |
| 1,114,591 | De Laney | Oct. 20, 1914 |
| 1,142,083 | Dodge | June 8, 1915 |
| 1,178,213 | Campbell | Apr. 4, 1916 |
| 1,350,351 | Abbott | Aug. 24, 1920 |
| 1,360,192 | Davidson | Nov. 23, 1920 |
| 1,369,902 | Miller et al. | Mar. 1, 1921 |
| 1,394,169 | Green | Oct. 18, 1921 |
| 1,626,194 | Henderson | Apr. 26, 1927 |
| 1,646,142 | Fassio | Oct. 18, 1927 |
| 1,667,119 | Kehoe | Apr. 24, 1928 |
| 1,687,458 | Lancelot et al. | Oct. 9, 1928 |
| 1,804,715 | Tafel | May 12, 1931 |
| 1,993,154 | Elkington | Mar. 5, 1935 |
| 2,046,311 | Carter | July 7, 1936 |
| 2,076,688 | West | Apr. 13, 1937 |